United States Patent
Kang et al.

(10) Patent No.: US 10,192,348 B2
(45) Date of Patent: Jan. 29, 2019

(54) METHOD AND APPARATUS FOR PROCESSING TEXTURE

(71) Applicant: SAMSUNG ELECTRONICS CO., LTD., Suwon-si, Gyeonggi-Do (KR)

(72) Inventors: Seok Kang, Yongin-Si (KR); Jeong-Ae Park, Seoul (KR)

(73) Assignee: SAMSUNG ELECTRONICS CO., LTD., Suwon-si, Gyeonggi-Do (KR)

(*) Notice: Subject to any disclaimer, the term of this patent is extended or adjusted under 35 U.S.C. 154(b) by 28 days.

(21) Appl. No.: 15/623,956

(22) Filed: Jun. 15, 2017

(65) Prior Publication Data

US 2018/0096515 A1    Apr. 5, 2018

(30) Foreign Application Priority Data

Oct. 5, 2016 (KR) .................. 10-2016-0128562

(51) Int. Cl.
*G06T 15/04*    (2011.01)
*G06T 15/00*    (2011.01)
*G06T 1/60*    (2006.01)

(52) U.S. Cl.
CPC ............ *G06T 15/04* (2013.01); *G06T 1/60* (2013.01); *G06T 15/005* (2013.01)

(58) Field of Classification Search
None
See application file for complete search history.

(56) References Cited

U.S. PATENT DOCUMENTS

| | | |
|---|---|---|
| 6,353,874 B1 | 5/2002 | Morein |
| 6,483,504 B1 * | 11/2002 | Deering ................ G06T 5/20 345/419 |
| 2003/0020709 A1 | 1/2003 | Naegle et al. |
| 2008/0297528 A1 | 12/2008 | Kugler et al. |
| 2014/0286391 A1 | 9/2014 | Kim et al. |
| 2016/0048980 A1 | 2/2016 | Wang et al. |

FOREIGN PATENT DOCUMENTS

KR    10-2014-0116991    10/2014

OTHER PUBLICATIONS

Scherzer et al., "Exploiting Temporal Coherence in Real-Time Rendering", SIGGRAPH ASIA, 2010, Courses Article No. 24, pp. 1-26.
Qu et al., "Image Based Rendering With Stable Frame Rates", Proceedings of the Conference on Visualization, 2000, pp. 251-258.

* cited by examiner

*Primary Examiner* — Robert Bader
(74) *Attorney, Agent, or Firm* — F. Chau & Associates, LLC (57) ABSTRACT

A texture processing apparatus for performing filtering by using a plurality of textures. A controller is configured to obtain a first texel value from a memory, in which the first texel value is based on a computed first texel offset value. The previously-computed first texel offset value may be used as a second texel offset value to obtain a second texel value of a second texture if a same texture address is input with respect to the first texture and the second texture that are continuously input. A texture filter is configured to perform filtering based on the obtained texel value of the first texture and the texel value of the second texture.

20 Claims, 8 Drawing Sheets

```
01: uniform sampler2D tDiffuse;
02: uniform sampler2D tPosition;
03: uniform sampler2D tNormals;
04: uniform vec3 cameraPosition;
05:
06: void main ( void )                      610
07: {
08:    vec4 image = texture2D ( tDiffuse, gl_TexCoord [0] . xy ) ;
09:    vec4 position = texture2D ( tPosition, gl_TexCoord [0] . xy ) ;
10:    vec4 normal = texture2D ( tNormals, gl_TexCoord [0] . xy ) ;
11:
12:    vec3 light = vec3 (50,100,50) ;
13:    vec3 lightDir = light - position.xyz ;
14:
15:    normal = normalize (normal) ;
16:    lightDir = normalize (lightDir) ;
17:
18:    vec3 eyeDir = normalize (cameraPosition-position.xyz) ;
19:    vec3 vHalfVector = normalize (lightDir .xyz+eyeDir) ;
20:
21:    gl_FragColor = max ( dot (normal, lightDir ) , 0 ) * image +
22:                   pow (max (dot (normal, vHalfVector) , 0.0 , 100 ) * 1.5 ;
23: }
```

```
01: uniform sampler2D tDiffuse;
02: uniform sampler2D tPosition;
03: uniform sampler2D tNormals;
04: uniform vec3 cameraPosition;
05:
06: void main ( void )                                          ,-610
07: {
08:    vec4 image = texture2D ( tDiffuse, gl_TexCoord [0] . xy ) ;
09:    vec4 position = texture2D ( tPosition, gl_TexCoord [0] . xy ) ;
10:    vec4 normal = texture2D ( tNormals, gl_TexCoord [0] . xy ) ;
11:
12:    vec3 light = vec3 (50,100,50) ;
13:    vec3 lightDir = light - position.xyz ;
14:
15:    normal = normalize (normal) ;
16:    lightDir = normalize (lightDir) ;
17:
18:    vec3 eyeDir = normalize (cameraPosition-position.xyz) ;
19:    vec3 vHalfVector = normalize (lightDir .xyz+eyeDir) ;
20:
21:    gl_FragColor = max ( dot (normal, lightDir ) , 0 ) * image +
22:              pow (max (dot (normal, vHalfVector) , 0.0 , 100 ) * 1.5 ;
23: }
```

FIG. 6B

```
01: uniform sampler2D tDiffuse;
02: uniform sampler2D tPosition;
03: uniform sampler2D tNormals;
04: uniform vec3 cameraPosition;
05:
06: void main ( void )
07: {                                                              /620
08:    vec4 image = texture2D ( tDiffuse, gl_TexCoord [0] . xy ) ;
09:    vec4 position = texture2D ( tPosition ) ;
10:    vec4 normal = texture2D ( tNormals ) ;
11:
12:    vec3 light = vec3 (50,100,50) ;
13:    vec3 lightDir = light - position.xyz ;
14:
15:    normal = normalize (normal) ;
16:    lightDir = normalize (lightDir) ;
17:
18:    vec3 eyeDir = normalize (cameraPosition-position.xyz) ;
19:    vec3 vHalfVector = normalize (lightDir .xyz+eyeDir) ;
20:
21:    gl_FragColor = max ( dot (normal, lightDir ) , 0 ) * image +
22:                   pow (max (dot (normal, vHalfVector) , 0.0 , 100 ) * 1.5 ;
23: }
```

METHOD AND APPARATUS FOR PROCESSING TEXTURE

CROSS-REFERENCE TO RELATED APPLICATION

This application claims the benefit of priority from Korean Patent Application No. 10-2016-0128562, filed on Oct. 5, 2016, in the Korean Intellectual Property Office, the disclosure of which is incorporated by reference herein.

1. Technical Field

The inventive concept relates to methods and apparatuses for processing texture.

2. Discussion of the Related Art

A graphics processing unit (GPU) may include a texture processing unit to accelerate three-dimensional (3D) graphics rendering.

Examples of 3D graphics application program interface (API) standards include Open Graphics Library (OpenGL), OpenGL ES, and Direct 3. The API standards refer to methods of rendering each frame of 3D graphics and displaying an image.

The texture processing unit performs a process of generating a texture used for texturing. Texturing is a process of adding a prepared image to an object formed in a 3D space, and is one of the operations in 3D graphics rendering for reducing a computational amount. The prepared image is referred to as a texture. The texture may be compressed and stored beforehand in an external memory of the texture processing unit.

SUMMARY

The inventive concept includes methods and apparatuses for processing a texture, in which a texture processor performs filtering by using a plurality of textures, and no (e.g. without any or a relatively low quantity of) redundant texel offset computations are performed, and the lack of redundant texel offset computations may reduce power consumption and increase texture processing performance.

In an embodiment of the inventive concept, a non-transitory computer-readable recording medium stores a program that performs a texture processing method when executed by a computer.

Additional teachings of the inventive concept will be set forth in part in the description which follows, which will be understood by a person of ordinary skill in the art and, from the description and drawings, and may be additionally learned by practice of the exemplary embodiment of the inventive concept.

According to an exemplary embodiment of the inventive concept, a texture processing apparatus for performing filtering by using a plurality of textures, the texture processing apparatus including: a controller configured to: obtain a texel value of a first texture from a memory; obtain a texel value of a second texture based on a first texel offset value in response to an output from a compare circuit that a first texture address and a second texture address that are continuously input with respect to the first texture and the second texture are the same; and a texture filter configured to perform filtering based on the obtained texel value of the first texture and the texel value of the second texture. The texture processing apparatus further comprises an offset memory configured to store the first texel offset value.

The controller may be configured to compute a second texel offset value to obtain the texel value of the second texture in response to a determination that the first texture address is not the same as the second texture address. A compare circuit may compare the addresses stored in a register.

If the same texture address is input with respect to the first texture and the second texture, the controller is configured to determine a texel address of the second texture based on the first texel offset value by using the first texel offset value stored in the offset memory as the second texel offset value and to obtain a texel value stored at the texel address of the second texture from the memory.

The controller is configured to obtain a texture address of the first texture and compute the first texel offset value of a first texture space based on the texture address of the first texture.

The first texel offset value is computed based on a distance between a reference texel of the first texture of the first texture space and a texel of the first texture.

The controller is configured to determine the texture address of the first texture based on the first texel offset value and an address of a reference texel of the first texture and to obtain a texel value stored at the texture address of the first texture from the memory.

If a size of a base map of the first texture and a size of a base map of the second texture are the same, the controller is configured to determine that a same texture address is input with respect to the first texture and the second texture.

If a size of a base map of the first texture and a size of a base map of the second texture are not the same, the controller is configured to compute the second texel offset value of a second texture space based on the texture address of the second texture, to determine a texel address of the second texture based on the computed second texel offset value and an address of a reference texel of the second texture, and to obtain a texel value stored in the texel address of the second texture from the memory.

The texture filter may be configured to transmit a filtering resultant value to a shader core.

According to an exemplary embodiment of the inventive concept, a texture processing method performed by a texture processing apparatus for performing filtering by using a plurality of textures, the texture processing method comprising: obtaining a first texture and a second texture that are continuously input; determining whether a first texture address of the first texture and a second texture address of the second texture are the same; if the first texture address and the second texture address are the same, designating a first texel offset value used to obtain a texel value of the first texture as being a second texel offset value of the second texture, and obtaining a texel value of the second texture from a memory based on the second texel offset value; and performing filtering based on the texel value of the first texture and the texel value of the second texture.

The texture processing method further comprises storing the first texel offset value.

The designating (e.g. determining) of the first texel offset value to be the second texel offset value includes determining the stored first texel offset value as the second texel offset value; determining a texel address of the second texture based on the first texel offset value; and obtaining a texel value stored at the texel address of the second texture from the memory.

The texture processing method further includes obtaining a texture address of the first texture; and calculating the first texel offset value of a first texture space based on the texture address of the first texture.

The first texel offset value is computed based on a distance between a reference texel of the first texture of the first texture space and a texel of the first texture.

The texture processing method further includes determining the texture address of the first texture based on the first texel offset value and an address of a reference texel of the first texture; and obtaining a texel value stored at the texture address of the first texture from the memory.

The determining of whether the texture address of the first texture and the texture address of the second texture are the same includes: if a size of a base map of the first texture and a size of a base map of the second texture are the same, determining that the texture address of the first texture and the texture address of the second texture are the same.

The texture processing method may further include, if the texture address of the first texture and the texture address of the second texture are not the same: calculating the second texel offset value of a second texture space based on the texture address of the second texture; determining a texel address of the second texture based on the computed second texel offset value and an address of a reference texel of the second texture; and obtaining a texel value stored at the texel address of the second texture from the memory.

The texture processing method further comprising: transmitting a filtering resultant value to a shader core.

According to an exemplary embodiment of the inventive aspect, a graphic processing apparatus comprising: a shader-core configured to perform pixel shading to determine colors of pixels constituting a frame; and a texture processor configured to obtain texture addresses with respect to a first texture and a second texture that are used to determine the colors of the pixels, and, if the texture address of the first texture and the texture address of the second texture are same, obtain a texel value by using a first texel offset value used to obtain a texel value of the first texture as a second texel offset value used to obtain a texel value of the second texture from a memory, and perform filtering based on the texel value of the first texture and the texel value of the second texture.

The texture processor is configured to compute the first texel offset value of a first texture space based on the texture address of the first texture, store the computed first texel offset value, and use the stored first texel offset value to obtain the texel value of the second texture.

According to an exemplary embodiment, a non-transitory computer-readable recording medium stores a program that performs a texture processing method according to the inventive concept when executed by a computer. According to an embodiment of the inventive concept, the shader core may be configured to transmit a first texture coordinate of the first texture and a second texture coordinate of the second texture to the texture processor, and to receive a filtering resultant value from the texture processor.

According to an embodiment of the inventive concept, the shader core may transmit information to the texture processor regarding whether the texture address of the first texture and the texture address of the second texture are the same.

BRIEF DESCRIPTION OF THE DRAWINGS

The teachings of the inventive concept will be better understood and more readily appreciated by a person of ordinary skill in the art from the following description of at least one example embodiment, taken in conjunction with the accompanying drawings in which.

DETAILED DESCRIPTION

Reference will now be made in detail to at least one exemplary embodiment of the inventive concept, examples of which are illustrated in the accompanying drawings, wherein like reference numerals refer to like elements throughout. In this regard, the examples of the inventive concept may have different forms and should not be construed as being limited to the descriptions set forth herein. Accordingly, the at least one embodiment of the inventive concept is provided for illustrative purposes, and the inventive concept is not limited to the example(s) shown and described herein. The drawing figures, used in conjunction with the specification, will provide an explanation regarding the inventive concept. As used herein, the term "and/or" includes any and all combinations of one or more of the associated listed items. Hereinafter, exemplary embodiments of the inventive concept will be described in detail with reference to the accompanying drawings. However, the present inventive concept is not limited to the at least one exemplary embodiment shown and described herein. In the drawings, like reference numerals denotes like elements.

The terms used in the following descriptions are those terms currently used in the art by a person of ordinary skill in consideration of functions in regard to the exemplary embodiments, but the terms may vary according to the intention of those of ordinary skill in the art, precedents, or new technology in the art.

Also, in some cases, the applicant may voluntarily select some terms for better understanding and/or for convenience of description, and in this case, the detailed meanings thereof will be described in the relevant sections. The terms used in the following description should be understood not as simple names but based on the meaning of the terms and the overall description of the exemplary embodiments as would be understood by a person of ordinary skill in the art.

Although terms such as "first" and "second" may be used herein to describe various elements or components, these elements or components should not be limited by these terms. These terms are only used to distinguish one element or component from another element or component. For example, a first element may be termed a second element, and, similarly, a second element may be termed a first element, without departing from the scope of the inventive concept. As used herein, the term "and/or" includes any and all combinations of one or more of the associated listed items.

The terms such as "comprise", "include", and "have" used in this specification may not be interpreted as necessarily including all of various elements or operations described in this specification, and may be interpreted as not including some of the various elements or operations, or as further including additional elements or operations. It will be understood that terms such as "comprise", "include", and "have", when used herein, specify the presence of stated features, integers, steps, operations, elements, components, or combinations thereof, but do not preclude the presence or addition of one or more other features, integers, steps, operations, elements, components, or combinations thereof.

The terms used in this specification are used for describing exemplary embodiments and do not limit the scope of the present inventive concept. As used herein, the singular forms "a", "an", and "the" are intended to include the plural forms as well, unless the context clearly indicates otherwise.

Hereinafter, example embodiments of the inventive concept will be described in detail with reference to the accompanying drawings. The example embodiments relate to methods and apparatuses for processing textures, and detailed descriptions of matters well-known to those of ordinary skill in the art may be omitted for conciseness.

Figure 1:
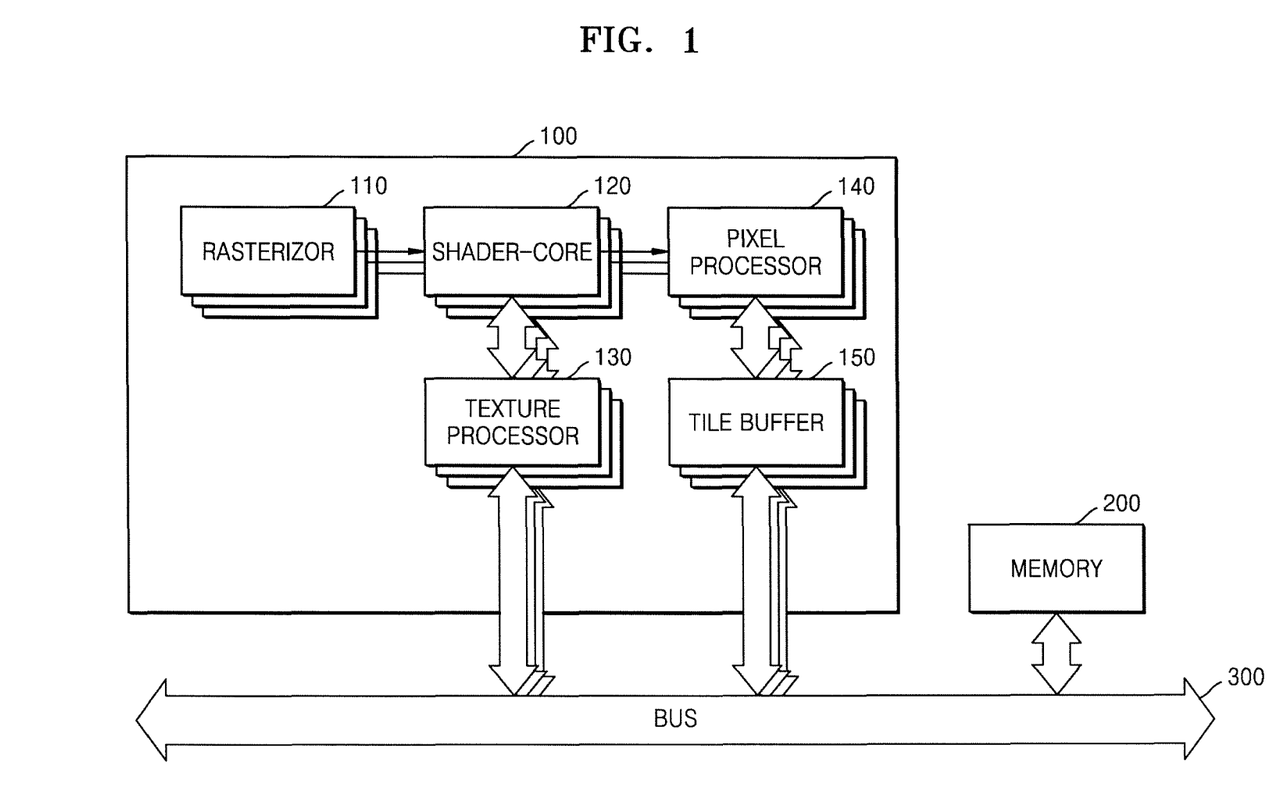
FIG. 1 is a diagram illustrating a graphics processing unit (GPU) according to an example embodiment of the inventive concept.

FIG. 1 is a diagram illustrating a graphics processing unit (GPU) 100 according to an example embodiment.

A person of ordinary skill in the art should understand and appreciate that that the GPU 100 shown in FIG. 1 may include other components in addition to components illustrated in FIG. 1.

Referring to FIG. 1, the GPU 100 may include, for example, a rasterizer 110, a shader-core 120, a texture processor 130, a pixel processor 140, and a tile buffer 150. However, the illustrated components are not indispensable components, and according to an embodiment of the inventive concept, the GPU 100 may be implemented by including more components or fewer components than the illustrated components shown in FIG. 1. The above components will be sequentially described below.

The GPU 100 may transmit and receive data to and from a memory 200 external to the GPU 100 through a bus 300.

The GPU 100 may comprise, for example, a three-dimensional (3D) graphics processing unit and may utilize a tile-based rendering (TBR) method as illustrated in FIG. 1. For example, 3D graphics may be generated corresponding to one frame, and the GPU 100 may process a plurality of split tiles having a predetermined size through the rasterizer 110, the shader-core 120, and the pixel processor 140 and store processing results in the tile buffer 150.

The GPU 100 may process some or all of the tiles in parallel by using a plurality of channels each including the rasterizer 110, the shader-core 120, and the pixel processor 140. When a plurality of tiles corresponding to a frame are processed, the GPU 100 may transmit the processing result stored in the tile buffer 150 to a frame buffer (not shown), which may be at least part of the memory 200.

With continued reference to FIG. 1, the shader-core 120 may include a pixel shader. The shader-core 120 may further include a vertex shader or may be constructed as an integrated shader in which a vertex shader and a pixel shader are integrally formed. When the shader-core 120 may execute a function of the vertex shader, the shader-core 120 may generate a primitive representing an object and transmit the object to the rasterizer 110. Also, the shader-core 120 may receive a rasterized primitive from the rasterizer 110 to perform pixel shading.

The rasterizer 110 may rasterize a primitive generated from the vertex shader through, for example, a geometric transformation process.

The shader-core 120 may perform pixel shading of determining colors of all pixels constituting a tile including fragments of the rasterized primitive. The shader-core 120 may use a pixel value generated by using a texture in a pixel shading process to generate, for example, stereoscopic and realistic 3D graphics.

When the shader-core 120 requests the texture processor 130 to transmit a pixel value corresponding to a desired pixel, the texture processor 130 may transmit a pixel value generated by processing a prepared texture. In this regard, the texture may be stored in a predetermined space of the texture processor 130 or in the memory 200 outside the GPU 100. When a specific texture used to generate the pixel value requested by the shader-core 120 is not present in the predetermined space of the texture processor 130, the texture processor 130 may fetch and use the texture from storage (e.g., memory 200).

The pixel processor 140 may determine substantially all of the pixel values corresponding to a tile by determining a pixel value to be finally displayed, through a process such as a depth test, with respect to pixels corresponding to the same position in the tile.

The tile buffer 150 may store substantially all pixel values corresponding to the tile received from the pixel processor 140. When a graphic processing process on substantially all of the tiles constituting one frame is completed, the processing result stored in the tile buffer 150 may be transmitted to the frame buffer of the memory 200.

Hereinafter, the 3D graphics processing process will be described in more detail with reference to FIG. 2.

Figure 2:
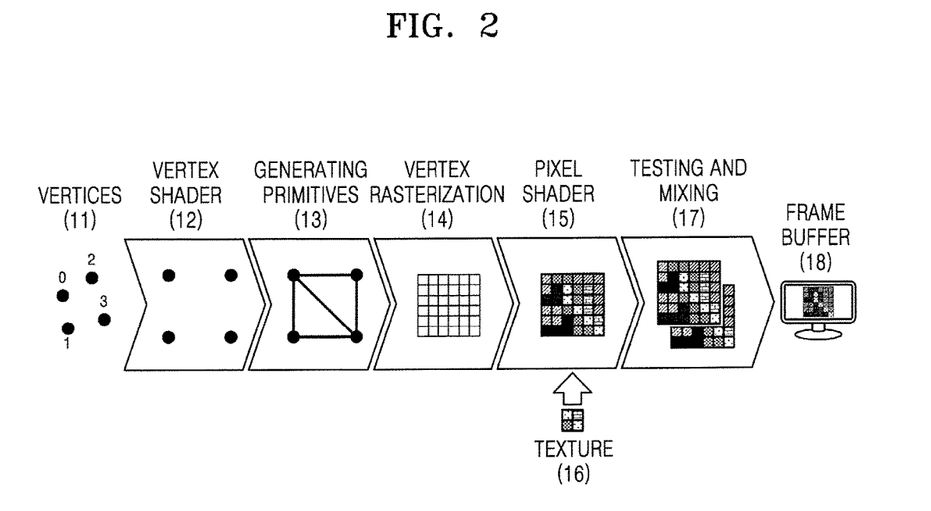
FIG. 2 is a diagram illustrating a process of processing three-dimensional (3D) graphics performed by the GPU of FIG. 1 according to an example embodiment of the inventive concept.

FIG. 2 is a diagram illustrating an example of processing 3D graphics performed by the GPU 100 of FIG. 1 according to an example embodiment of the inventive concept.

FIG. 2 illustrates an example of processing 3D graphics including operations 11 through 17. The processing of 3D graphics may be largely divided into three operations, i.e., geometric conversion, rasterization, and pixel shading, as will be described in more detail below.

Operation 11 includes an operation of generating vertices. The vertices may be generated to represent objects included in 3D graphics, but is not limited to 3D graphics.

Operation 12 includes an operation of shading the generated vertices. A vertex shader may shade the vertices by designating positions of the vertices generated in operation 11.

Operation 13 includes an operation of generating primitives. A primitive refers to a point, a line, or a polygon formed by using at least one vertex. As a non-limiting example, the primitive may represent a triangle formed by connecting the vertices.

Operation 14 includes an operation of rasterizing the primitives. Rasterizing a primitive refers to dividing the primitive into a plurality of fragments. A fragment may be a basic unit for performing graphic processing on the primitive. Since the primitive includes only information about a vertex, graphic processing on 3D graphics may be performed by generating fragments between the vertices in the operation of rasterizing the primitives.

Operation 15 includes an operation of shading a pixel. The fragments constituting the rasterized primitives may be pixels that constitute a tile. In the relevant art, the terms "fragment" and "pixel" may be interchangeably used in some cases. For example, the pixel shader may be referred to as a fragment shader. In general, a basic unit of graphics processing constituting a primitive may be referred to as a fragment, and a basic unit of graphics processing from pixel shading may be referred to as a pixel. A color of a pixel may be determined in pixel shading.

Operation 16 includes a texturing operation for determining a color of the pixel. Texturing may include a process of determining the color of the pixel by using a prepared image, for example, a texture. Since calculating and determining a color of each pixel to represent various colors and patterns in the real world increase an amount of data sufficient for graphics processing and a graphics processing time, the prepared texture may be used to determine the color of the pixel. For example, a surface color of an object may be stored as a separated two-dimensional (2D) image that can be a texture and the stored texture may be scaled up or down according to a position and a size of the object on a screen or texel values may be mixed by using textures having various resolutions, thereby determining the color of the pixel.

More specifically, during pixel shading, to more rapidly process 3D graphics, pixel values generated using a prepared texture may be used. In this case, one way to adaptively handle the size of an object may include preparing a plurality of textures having different resolutions beforehand and may include generating pixel values from a combination of the plurality of textures. In this example, the plurality of prepared textures having different resolutions are referred to as mipmaps. For example, if there is a desire to generate pixel values of an object having an intermediate resolution between the resolutions of two mipmaps previously prepared, texel values of a location corresponding to the object may be extracted from the two mipmaps and then filtered.

Operation 17 includes a testing and mixing operation. Pixel values corresponding to one tile may be determined by performing a process, e.g., a depth test, on pixels corresponding to the same position on the one tile to determine pixel values for a final display. 3D graphics corresponding to one frame may be generated by mixing a plurality of tiles generated through the above process.

Operation 18 includes an operation of storing the frame generated in operations 11 through 17 in the frame buffer and displaying the frame stored in the frame buffer through a display unit.

Figure 3:
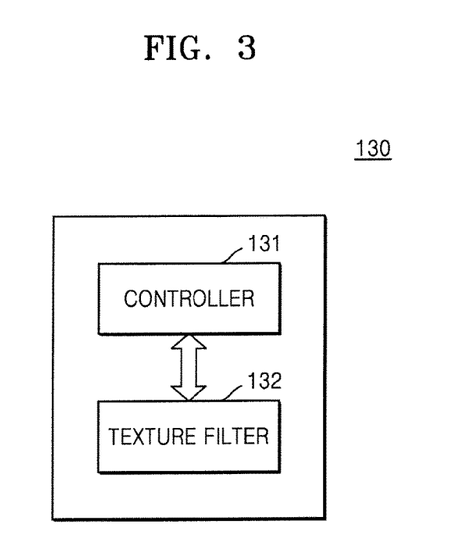
FIG. 3 is a block diagram of a configuration of a texture processing unit illustrated in FIG. 1 according to an example embodiment of the inventive concept.

FIG. 3 is a block diagram of a configuration of the texture processor 130 illustrated in FIG. 1 according to an example embodiment of the inventive concept.

Referring to FIG. 3, the texture processor 130 may include, for example, a controller 131 and a texture filter 132. However, a person of ordinary skill in the art should understand and appreciate that not all of the illustrated components are indispensable components. For example, the texture processor 130 may include more or less components than the illustrated components. The above components will be sequentially described below.

For example, the texture processor 130 may be located between a shader core and a memory and may process a texture requested by the shader core and transmit the processed texture to the shader core. The texture processor 130 may receive a texture request by receiving a texture coordinate corresponding to a pixel to be processed by the shader core. The texture processor 130 may receive a texture data that may not be stored in the memory. For example, the texture processor 130 may receive a compressed texture from a memory external to the texture processor 130, and process the texture.

The controller 131 may perform arithmetic operations used to control the texture processor 130 or may transmit a control signal to the texture filter 132 to control overall operations of the texture processor 130.

With further regard to the texture processor 130, the controller 131 may obtain a texture address corresponding to the texture that the texture processor 130 is requested to provide. In other words, the controller 131 may receive the texture coordinate corresponding to a pixel coordinate of the pixel to be processed by the shader core. The controller 131 may convert the texture coordinate received from the shader core into an address of a texture cache (not shown) where the texture corresponding to the texture coordinate is stored. The controller 131 may read a texture corresponding to the texture address from the texture cache (not shown).

In addition, the controller 131 may receive a first texture coordinate of a first texture corresponding to a pixel coordinate of a pixel that is part of a frame from the shader core. The controller 131 may obtain a texture address of the first texture corresponding to the first texture coordinate. The controller 131 may compute a first texel offset value of a first texture space based on the texture address of the first texture (or the first texture coordinate of the first texture). It should be understood by a person of ordinary skill in the art that the first texel offset value may be computed by an equation defined in a graphics application program interface (API) such as Open Graphics Library (OpenGL), DirectX (DX) of Microsoft, and Compute Unified Device Architecture (CUDA).

With regard to the first texel offset value being computed by an equation defined in a graphics application program, the first texel offset value may be computed based on a distance between a reference texel (for example, a first texel of the first texture) of the first texture and texels of the first texture in the first texture space. A size of the first texture may also be used to compute the first text offset value.

Figure 4:
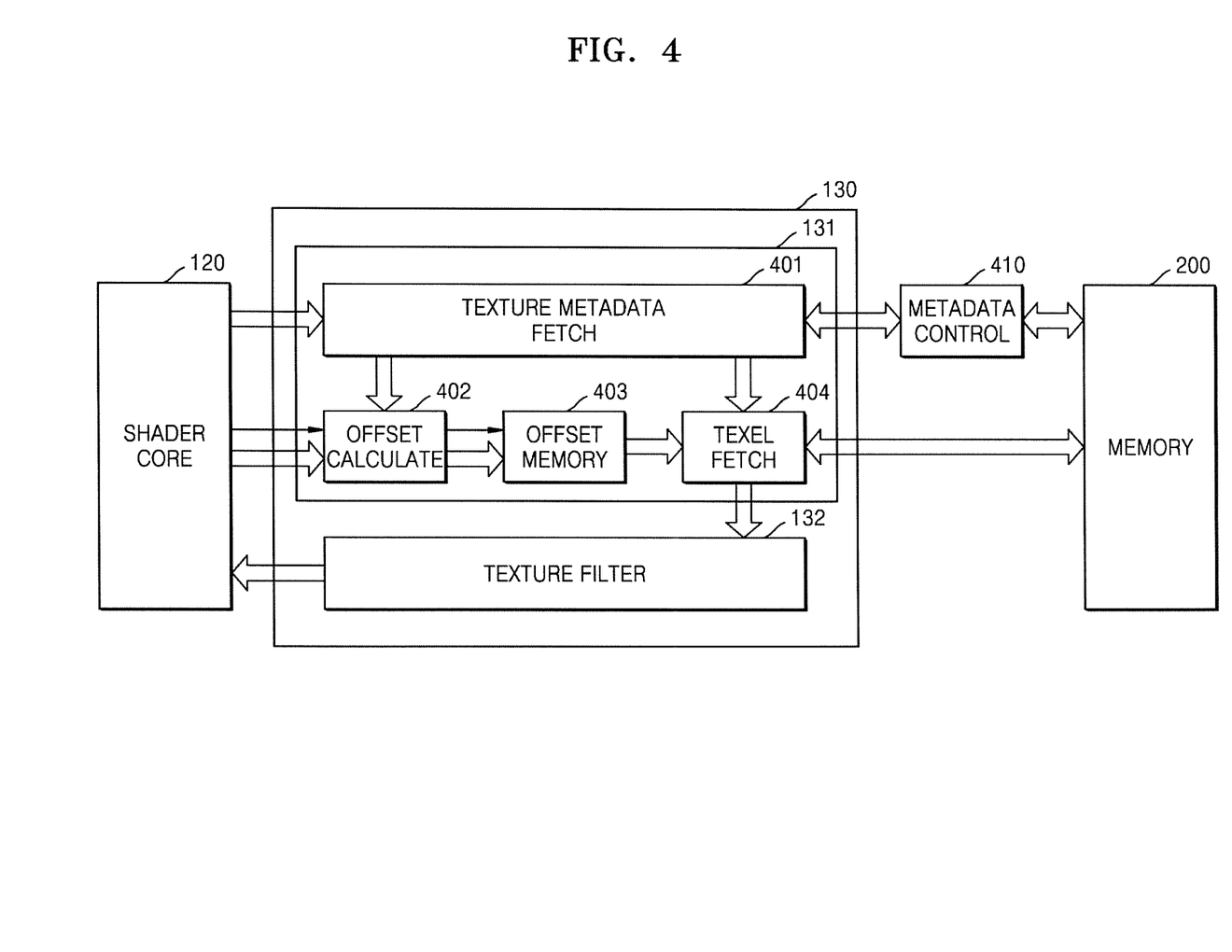
FIG. 4 is a detailed block diagram of the configuration of the texture processing unit illustrated in FIG. 1 according to an example embodiment of the inventive concept.

The texture processor 130 may further include an offset memory 403 (FIG. 4). The offset memory 403 may store the first texel offset value. When the first texel offset value is reused, the controller 131 may call the first texel offset value stored in the offset memory 403 to process a texture.

A texel address, in general, may be generated into a texture based on a texture mapping of the texture to an object, for example, a primitive such as a polygon. Accordingly, the controller 131 may determine the texel address of the first texture based on the first texel offset value and an address of the reference texel of the first texture. The controller 131 may obtain a texel value stored in the texel address of the first texture from the memory. The obtained texel value of the first texture may be used by the texture filter 132 to perform filtering. Texture filtering may be applied to determine a texture color using the colors of neighboring texels, and to prevent artifacts.

The controller 131 may receive a second texture coordinate of a second texture corresponding to the pixel coordinate of the pixel from the shader core. To determine a texel value of the second texture used to determine a pixel value, the controller 131 may obtain a texel address of the second texture. In this regard, the controller 131 may determine the texel address of the second texture by using a second texel offset value. According to the inventive concept, if the second texel offset value is equal to the previously calculated first texel offset value, the controller 131 may determine the texel address of the second texture by using the first texel offset value without having to compute the second texel offset value, as computing the second texel offset value in this case may constitute a redundant calculation in view of the first computed first texel offset value. Thus, in an embodiment of the inventive concept, there may be no redundant texel offset calculations performed to determine the texel address of the second texture by using the previously-calculated first texel offset value instead of newly-calculating the second texel offset value.

If the texture address of the first texture and the texture address of the second texture are the same, the controller 131 may obtain the texel value by using the first texel offset value used to obtain the texel value of the first texture as the second texel offset value used to obtain the texel value of the second texture.

More specifically, if the texture address of the first texture and the texture address of the second texture are the same, the controller 131 may determine the texel address of the second texture based on the first texel offset value by using the first texel offset value stored in the offset memory as the second texel offset value. The controller 131 may obtain the texel value stored in the texel address of the second texture from the memory to reduce the amount of processing to be performed.

If a size of a base map of the first texture and a size of a base map of the second texture are the same, the controller 131 may determine that the same texture address is input with respect to the first texture and the second texture. It is also within the inventive concept that the controller 131 may determine that the same texture address is input if the size of the base map of the first texture and the size of the basemap of the second texture are substantially the same (e.g. within a predetermined tolerance in size, such as 1%, 5%, etc.).

If the texture address of the first texture and the texture address of the second texture are not the same, the controller 131 may determine the second texel offset value in a second texture space based on the texture address of the second texture. The controller 131 may determine the texel address of the second texture based on the second texel offset value and an address of a reference texel of the second texture. The controller 131 may obtain a texel value stored in the texture address of the second texture.

The texture filter 132 may perform texture filtering 132 by using, for example, the texel value of the first texture and the texel value of the second texture. Filtering texel values may be defined as obtaining a color value corresponding to a pixel by blending the texel values. For example, the requested texture may be obtained by calculating an average of texel values included in a region of a texture space including the coordinates of the texture received by the texture processor 130. A value obtained by performing texture filtering by the texture filter 132 may be transmitted to the shader core. A texture filtering mode performed by the texture filter 132 may be any of various modes, e.g., point filtering, bilinear filtering, tri-linear filtering, etc., each of which are discussed in the following three paragraphs:

Point filtering refers to a mode in which when a texture that may be added to an object to be rendered is determined, four neighboring texels are obtained and a nearest texel among the four neighboring texels is output, based on the coordinates of the texture.

Bilinear filtering refers to a mode, wherein, when a texture to be added to an object that may be rendered is determined, four neighboring texels are obtained based on the coordinates of the texture and every two texels among the four neighboring texels are interpolated, results of interpolating the every two texels are interpolated again, and a final result of interpolating the results of interpolating the every two texels is output.

Tri-linear filtering refers to a mode in which bilinear filtering is performed on each of two mipmaps by using four texels selected from each of the two mipmap levels, based on the coordinates of a texture, bilinear filtering is performed again on values obtained by respectively performing bilinear filtering on the two mipmaps, and a result of performing bilinear filtering on the values is output.

With continued reference to FIG. 3, the texture processor 130 may further include a texture cache (not shown). The texture cache (not shown) may store textures. The texture cache (not shown) may store some textures received from the memory to minimize a delay in graphics processing due to the exchange of data between the texture processor 130 and the memory. The texture cache (not shown) may be a module installed separately from the texture processor 130. For example, the texture cache (not shown) may be embodied as a separate module located between the texture processor 130 and the memory.

The texture processor 130 may include a central operation processor to control the overall operations of the controller 131, the texture filter 132, the texture cache (not shown), and the offset memory (not shown). The central operation processor may be implemented, for example, by a plurality of logic gates, or may be implemented by a combination of a general-purpose microprocessor and the offset memory or other memory storing a program that may be executed in the microprocessor. Also, those of ordinary skill in the art will understand that the central operation processor may also be implemented by other types of hardware.

Various applications or operations performed by the texture processor 130 will now be described herein below. However, such applications or operations, which may be clearly understood and expected by those of ordinary skill in the art even without specifying any one of the controller 131, the texture filter 132, the texture cache (not shown), and the offset memory (not shown), may be understood by general implementation, and the scope of the present inventive concept is not limited by the physical/logical structures or the terms of specific configurations.

FIG. 4 is a detailed block diagram of the configuration of the texture processor 130 illustrated in FIG. 1 according to an example embodiment of the inventive concept.

Referring to FIG. 4, the texture processor 130 may include a texture metadata fetch 401, an offset calculator 402, an offset memory 403, a texel fetch 404, and the texture filter 132. However, many of the illustrated components of the texture processor 130 are provided for illustrative purposes and the texture processor of the inventive concept is not limited to the arrangement shown in FIG. 4. For example, the texture processor 130 may be implemented with fewer components than the illustrated components. The texture processor may also be implemented with more components than shown. The above components will be sequentially described below.

Upon comparing FIGS. 3 and 4, FIG. 4 is a block diagram of the texture processor 130 including the subdivided controller 131. Also, FIG. 4 illustrates the shader core 120, the memory 200, and a metadata controller 410 in addition to the texture processor 130.

The texture processor 130 may receive a texture coordinate from the shader core 120, sample texel data (for example, a texel value) from a texture stored in the memory 200 by using the texture coordinate, and perform a filtering computation. The texture processor 130 may transmit a filtering resultant value to the shader core 120.

The texture metadata fetch 401 may receive information about a texture (for example, a first texture stored in the memory 200) of which metadata may be used from the shader core 120.

The texture processor 130 may obtain an address of a texel value of the first texture used to perform filtering by using the address (for example, an address of a first texel of the first texture) of a reference texel of the first texture and a texel offset value indicating how far the first texture is from the reference texel.

The address of the reference texel of the first texture may be stored in metadata including information about a texture. The texture metadata fetch 401 may receive the metadata from the memory via the metadata controller 410. The texture metadata fetch 401 may transmit metadata including the address of the reference texel of the first texture to the texel fetch 404.

The offset calculator 402 may receive a texture coordinate from the shader core 120 to compute the texel offset value. The texel offset value may be computed by an equation defined in a graphics API such as OpenGL. Information about a texture size sufficient for calculating the texel offset value may be transferred from the texture metadata fetch 401 to the texel fetch 404.

The offset calculator 402 may receive a first texture coordinate corresponding to a pixel coordinate of a pixel that is part of a frame from the shader core 120 and compute a first texel offset value of the first texture. The offset calculator 402 may receive a second texture coordinate corresponding to the pixel coordinate of the same pixel from the shader core 120. The offset calculator 402 may determine whether the second texture coordinate is the same as the first texture coordinate. In this case, if the second texture coordinate is the same as the first texture coordinate, the offset calculator 402 may not newly-compute (calculate) a second texel offset value of a second texture and instead may use the previously-computed (calculated) first texel offset value as the second texel offset value.

On the other hand, if the second texture coordinate is not the same as the first texture coordinate, the offset calculator 402 may newly compute the second texel offset value of the second texture.

The computed texel offset value may be stored in the offset memory 403. The offset memory 403 may also receive information about whether to transmit the stored texel offset value to the texel fetch 404 or whether to compute and transmit a new texel offset value from the offset calculator 402 and transmit the texel offset value to the texel fetch 404 based on a result of the information received by the offset memory.

The texel fetch 404 may determine a texel address of the first texture by using the address of the reference texel of the first texture and the first texel offset value. The texel fetch 404 may obtain a texel value of the first texture stored in the determined texel address of the first texture. The texel fetch 404 may transmit the obtained texel value of the first texture to the texture filter 132.

Additionally, if the second texture coordinate is the same as the first texture coordinate, the texel fetch 404 may determine a texel address of the second texture by using the second texel offset value as the first texel offset value. However, if the second texture coordinate is not the same as the first texture coordinate, the texel fetch 404 may determine the texel address of the second texture by using the newly computed second texel offset value without using the previously-computed first texel offset value. The texel fetch 404 may obtain a texel value of the second texture stored in the determined texel address of the second texture. The texel fetch 404 may transmit the obtained texel value of the second texture to the second texture filter 132.

The texture filter 132 may perform filtering based on the texel value of the first texture and the texture value of the second texture. The texture filter 132 may transmit a filtering resultant value to the shader core 120.

Various applications or operations performed by the texture processor 130 will be described herein below. However, a person of ordinary skill in the art should appreciate that some of the applications or operations discussed herein below may be described without specifying any one of the texture metadata fetch 401, the offset calculator 402, the offset memory 403, the texel fetch 404, and the texture filter 132, and the scope of the inventive concept is not limited by the physical/logical structures or the terms of specific configurations provided herein for illustrated purposes.

Figure 5:
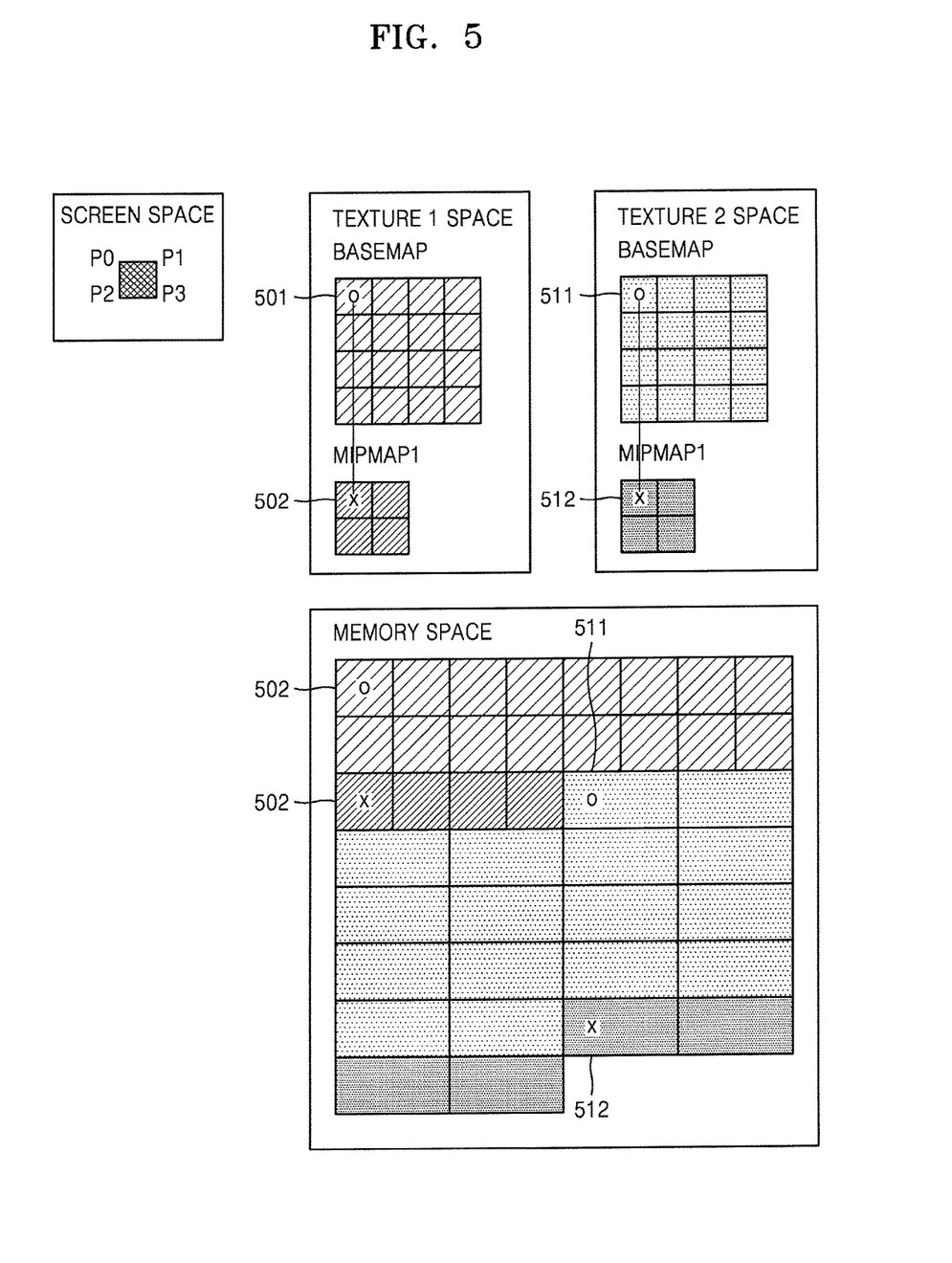
FIG. 5 is a diagram for describing a texture processing method of the texture processing unit according to an example embodiment of the inventive concept.

FIG. 5 is a diagram illustrating a texture processing method of the texture processor 130 according to an example embodiment of the inventive concept.

FIG. 5 illustrates an example of a process of obtaining a pixel value of a pixel P0 in a screen space by using a texel value of each of two textures. In this regard, a person of ordinary skill in the art should appreciate that although in the illustration two textures are used to obtain the pixel value of the pixel P0, the pixel value of the pixel P0 may be determined by using more than two textures.

The pixel value of the pixel P0 indicated in the screen space may be determined by using texel values of a first texture and a second texture. The texture processor 130 may receive a first texture coordinate of the first texture from a shader core. Specifically, the texture processor 130 may receive an operation instruction to obtain a texel value of (0,0) of a mipmap 1 in a first texture space. The texture processor 130 may obtain a texture address of the first texture corresponding to the first texture coordinate. The texture processor 130 may compute a first texel offset value based on a distance between a reference texel 501 of the first texture and a texel 502 of the first texture in the first texture space. The texture processor 130 may determine the texel address of the first texture based on the first texel offset value and an address of the reference texel 501 of the first texture and obtain a texel value stored in the texture address of the first texture from a memory.

With continued reference to FIG. 5, the texture processor 130 may receive a second texture coordinate of the second texture from the shader core. Specifically, the texture processor 130 may receive an instruction to obtain a texel value of (0,0) of a mipmap 1 in a second texture space. In this case, a texture coordinate in the second texture space may be the same as a texture coordinate in the first texture space. For example, a second texel offset value computed based on a distance between a reference texel 511 of the second texture and a texel 512 of the second texture may be the same value as the first texel offset value. In such a case, the texture processor 130 may not newly-compute the second texel offset value and may use the previously-computed first texel offset value as the second texel offset value. The texture processor 130 may determine a texture address of the second texture based on the first texel offset value and an address of the reference texel 511 of the second texture and obtain a texel value stored in the texture address of the second texture from the memory.

Figure 6A:
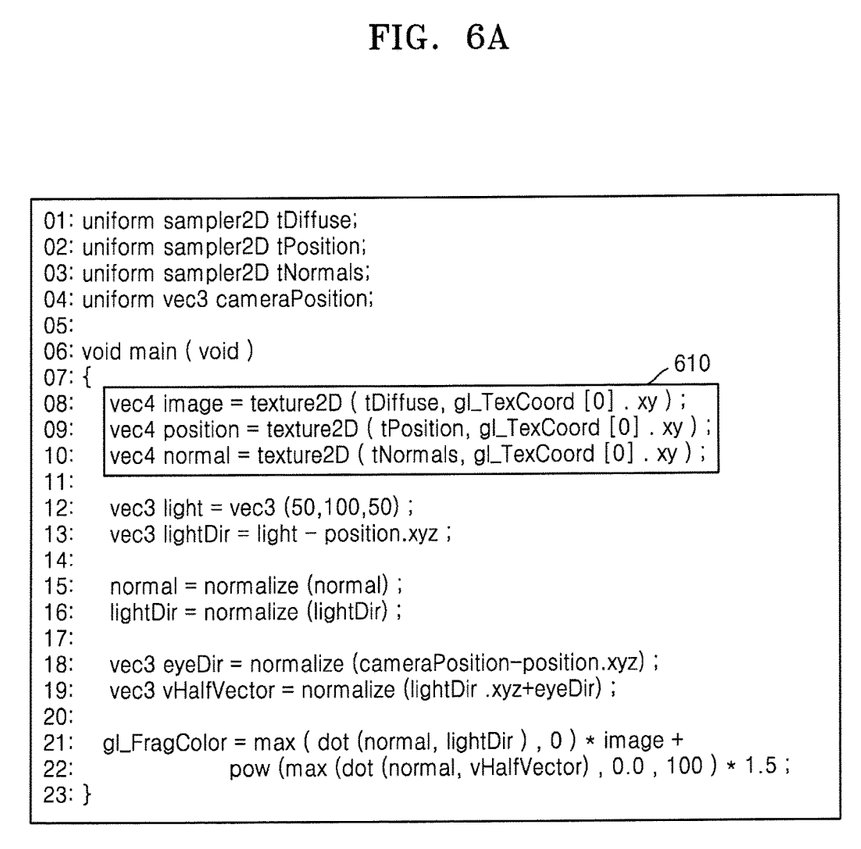
FIGS. 6A and 6B are diagrams for describing codes relating to whether the texture processing unit reuses a texel offset according to an example embodiment of the inventive concept.
Figure 6B:
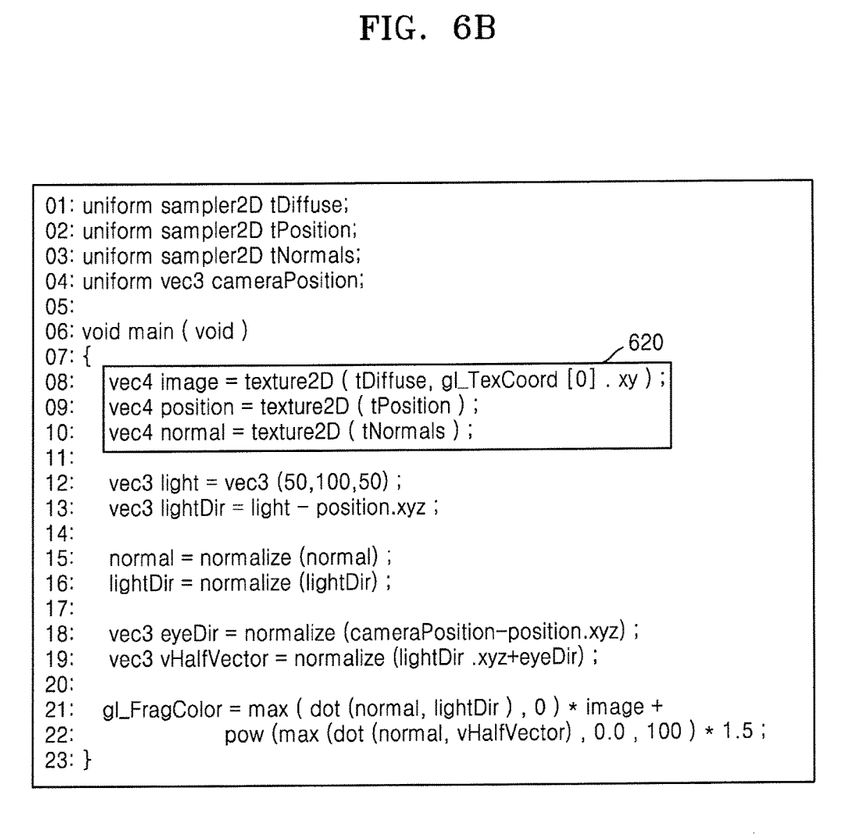

FIGS. 6A and 6B are diagrams for describing codes relating to whether the texture processor 130 reuses a texel offset according to an example embodiment.

As shown in FIG. 6A, the texture processor 130 may obtain a texel value from each of three types of textures as one way to determine a value of a pixel. A person of ordinary skill in the art should understand and appreciate that the inventive concept is not limited to the example of determining a value of a pixel as discussed herein. Referring to box 610 of FIG. 6A, gl_TexCoord [0], xy is a texture coordinate transferred from a shader core to the texture processor 130. If the texture processor 130 performs an operation by using codes shown in FIG. 6A, texel offset values should be computed three times. In this regard, since the three types of textures use the same texture coordinate, a texel offset value with respect to each of the three types of textures may be the same. For example, if a plurality of textures are used to determine the value of the pixel and texture coordinates are the same with respect to the plurality of textures, the texture processor 130 should perform texel offset computation as many times as the number obtained by multiplying the number of the plurality of textures and the number of times fragment shading is performed.

Referring to box 620 of FIG. 6B, it can be seen that the texture commands of lines 9-10 may not have a texture coordinate argument. The texture processor 130 may obtain texel values with respect to other textures by reusing the computed texel offset value while executing a texture command of line 8.

Figure 7:
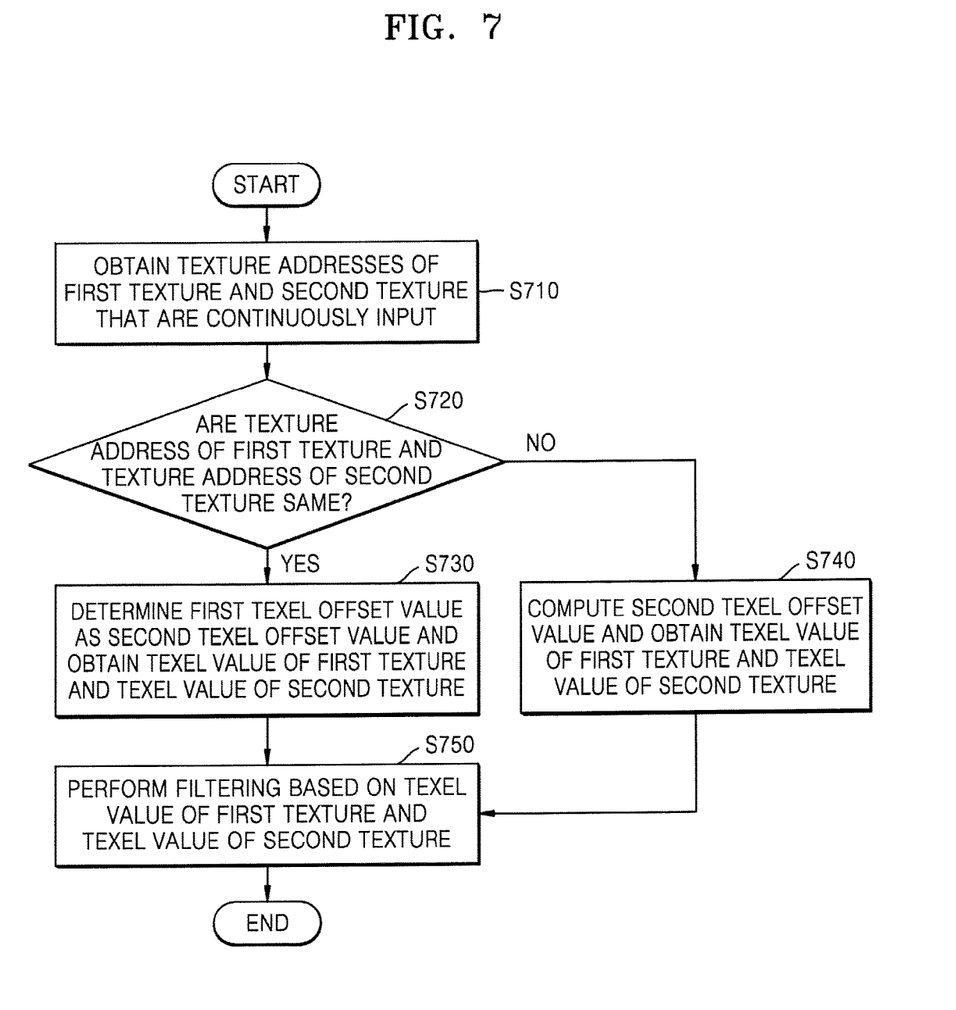
FIG. 7 is a flowchart of a texture processing method performed by a texture processing unit according to an example embodiment of the inventive concept.

FIG. 7 is a flowchart illustrating an example of a texture processing method performed by the texture processor 130 according to an example embodiment of the inventive concept.

Referring now to FIG. 7, the texture processor 130 may perform a filtering operation by using a plurality of textures. In operation S710, the texture processor 130 may obtain texture addresses with respect to a first texture and a second texture that are continuously input.

In operation S720, the texture processor 130 may determine whether the texture address of the first texture and the texture address of the second texture are the same. One way this may be accomplished, for example, is by a compare circuit (not shown) that may compare the first texture address and a second texture address that may be stored in respective registers. If the texture processor determines that the texture address of the first texture and the texture address of the second texture are the same, the texture processor 130 may perform operation S730. If the texture address of the first texture and the texture address of the second texture are not the same, the texture processor 130 may perform operation S740.

In operation S730, the texture processor 130 may determine a first texel offset value as also being a second texel offset value. In such as case, the texture processor 130 may designate the first texel offset value as being the second texel offset value. The texture processor 130 may determine a texel address of a texel based on a texel offset value of the texture and a reference texel of the texture and may obtain a texel value stored in the determined texel address of the texture. The texture processor 130 may obtain a first texel value of the first texture and a second texel value of the second texture by respectively using the first texel offset value and the second texel offset value. In this case, the second texel offset value is the same as the previously-calculated first texel offset value so there is no need to calculate (e.g. compute) the second texel offset value.

In operation S740, which is performed after determining at operation S720 that the texture address of the first texture and the texture address of the second texture are not the same, the texture processor 130 may compute a second texel offset value of a second texture space based on the texture address of the second texture. The texture processor 130 may determine a texel address of the second texture based on the computed second texel offset value and an address of a reference texel of the second texture. The texture processor 130 may obtain a texel value stored in the texel address of the second texture from a memory.

In operation S750, the texture processor 130 may perform filtering based on the texel value of the first texture and the texel value of the second texture. The texture processor 130 may transmit a filtering resultant value to a shader core.

Figure 8:
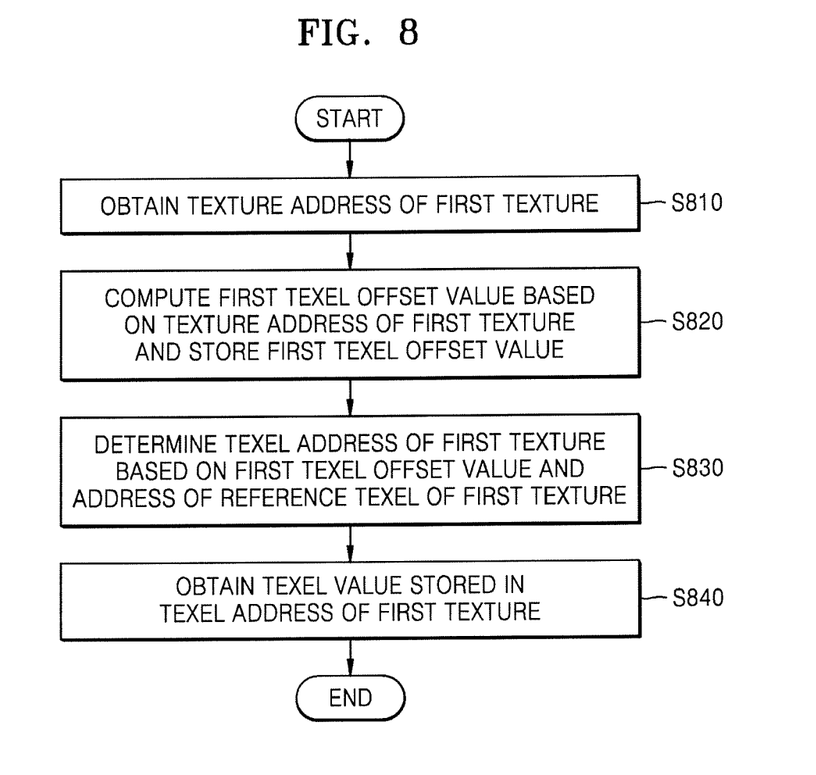
FIG. 8 is a diagram for describing an operation of storing a texel offset value and obtaining a texel value by using the texel offset value included in a texture processing method according to an example embodiment of the inventive concept.

FIG. 8 is a diagram illustrating an operation of storing a texel offset value and obtaining a texel value by using the texel offset value included in a texture processing method according to an example embodiment of the inventive concept.

Referring to FIG. 8, in operation S810, the texture processor 130 may obtain a texture address of a first texture.

In operation S820, the texture processor 130 may compute a first texel offset value based on the texture address of the first texture obtained in operation S810, and stores the computed first texel offset value.

In operation S830, the texture processor 130 may determine a texel address of the first texture based on the first texel offset value and an address of a reference texel of the first texture.

Figure 9:
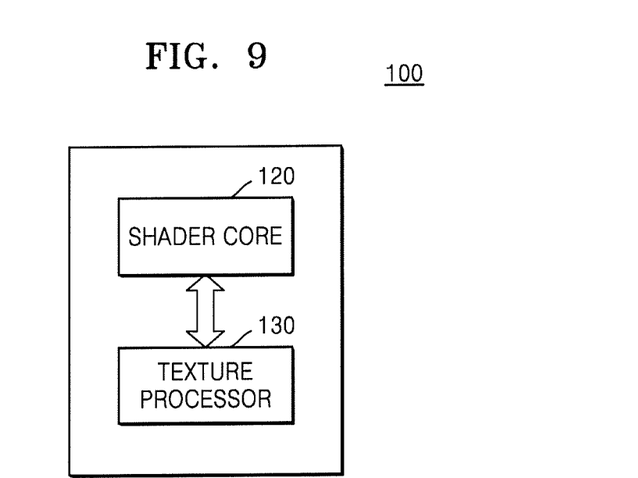
FIG. 9 is a block diagram of a configuration of the GPU of FIG. 1 according to an example embodiment of the inventive concept.

In operation S840, the texture processor 130 may obtain a texel value stored in the texel address of the first texture. FIG. 9 is a block diagram of a configuration of the GPU 100 of FIG. 1 according to an example embodiment of the inventive concept.

Referring now to FIG. 9, the GPU 100 may include the shader core 120 and the texture processor 130. However, not all of the illustrated components are indispensable components. The GPU 100 may be implemented by more components or less components than the illustrated components of FIG. 9. Each of the above components of FIG. 9 will be described herein below.

With continued reference to GPU 100, the shader core 120 may perform pixel shading to determine colors of a group of pixels constituting a frame. The shader core 120 may transmit texture addresses of a first texture and a second texture that are used to determine the colors of the pixels to the texture processor 130. In this case, the shader core 120 may also transmit information to the texture processor 130 about whether the texture address of the first texture and the texture address of the second texture are the same.

According to the inventive concept, the texture processor 130 may compute a texel offset value of a texture space based on a texture address of a texture. The texture processor 130 may determine the texel address of the texture based on the texel offset value and an address of a reference texel of the texture. The texture processor 130 may obtain a texel value stored in the texel address of the texture.

In addition, the texture processor 130 may compute a first texel offset value of a first texture space based on the texture address of the first texture and store the computed first texel offset value. If the texture address of the first texture and the texture address of the second texture are the same, the texture processor 130 may set the stored first texel offset value as a second texel offset value. Thus, the texture processor 130 may perform filtering without, or with a reduced amount of, redundant texel offset computations. The texture processor 130 may determine a texel address of the second texture based on the first texel offset value and obtain a texel value stored in the texel address of the second texture from a memory.

The above-described apparatuses may be implemented by hardware components, software components, and/or any combination thereof. For example, the apparatuses and components described in the exemplary embodiments may be implemented by using processors, arithmetic logic units (ALUs), digital signal processors, microcomputers, integrated circuits, field programmable arrays (FPAs), programmable logic units (PLUs), microprocessors, one or more general-purpose computers or special-purpose computers, or any other devices that may execute and respond to instructions.

The processing apparatus may execute an operating system (OS) and one or more software applications executed in the OS. Also, the processing apparatus may access, store, operate, process, and generate data in response to the execution of software.

For convenience of understanding, the description may disclose that one processing apparatus is used. However, a person of ordinary skill in the art will understand that the processing apparatus may include a plurality of processing elements and/or various types of processing elements. For example, the processing apparatus may include a plurality of processors or a processor and a controller. Also, the processing apparatus may include any other processing configurations such as parallel processors.

The software may include computer programs, executable codes, instructions, or any combination thereof, and may construct the processing apparatus for desired operations or may independently or collectively command the processing apparatus.

One way that software may be interpreted by the processing apparatus or to provide commands or data to the processing apparatus, the software and/or data may be permanently or temporarily embodied in any types of machines, components, physical devices, virtual equipments, computer storage mediums, or transmitted signal waves. The software may be distributed over network coupled computer systems so that it may be stored and executed in a distributed fashion. The software and data may be stored in one or more computer-readable recording mediums.

The methods according to the exemplary embodiments of the inventive concept may be embodied in the form of program commands executable through various computer components, which may be recorded on a computer-readable recording medium. The computer-readable recording medium may include program commands, data files, and data structures either alone or in combination. The program commands recorded on the computer-readable recording medium may be those that are especially designed and configured for the exemplary embodiments, or may be those that are known and available to computer programmers skilled in the art.

Examples of the computer-readable recording medium include magnetic recording media such as hard disks, floppy disks and magnetic tapes, optical recording media such as CD-ROMs and DVDs, magneto-optical recording media such as floptical disks, and hardware devices such as ROMs, RAMs and flash memories that are especially configured to store and execute program commands.

Examples of the program commands include machine language codes that may be generated by a compiler, and high-level language codes that may be executed by a computer by using an interpreter.

The above hardware devices may be configured to operate as one or more software modules to perform the operations of the exemplary embodiments, and vice versa.

Although the exemplary embodiments have been described with reference to the accompanying drawings, those of ordinary skill in the art will understand that various changes and modifications may be made therein. For example, the relevant results may be achieved even when the described technologies are performed in a different order than the described methods, and/or even when the described components such as systems, structures, devices, and circuits are coupled or combined in a different form than the described methods or are replaced or substituted by other components or equivalents.

Therefore, the scope of the inventive should be defined not by the described exemplary embodiments alone, but by the appended claims and the equivalents thereof.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, a person of ordinary skill in the art will understand that various changes in form and details may be made therein without departing from the spirit and scope of the inventive concept as defined by the following claims.

What is claimed is:

1. A texture processing apparatus for performing filtering by using a plurality of textures, the texture processing apparatus comprising: a controller configured to: obtain a texel value of a first texture from a memory; obtain a texel value of a second texture based on a first texel offset value in response to an output from a compare circuit that a first texture address and a second texture address that are continuously input with respect to the first texture and the second texture are the same; and a texture filter configured to perform filtering based on the obtained texel value of the first texture and the texel value of the second texture.

2. The texture processing apparatus of claim 1, wherein the controller is configured to compute a second texel offset value to obtain the texel value of the second texture in response to an output from the compare circuit that the first texture address is not the same as the second texture address.

3. The texture processing apparatus of claim 1, further comprising: an offset memory configured to store at least the first texel offset value.

4. The texture processing apparatus of claim 3, wherein if the first texture address and the second texture address are the same, the controller is configured to determine a texel address of the second texture based on the first texel offset value stored in the offset memory to obtain the texel value stored at the texel address of the second texture from the memory.

5. The texture processing apparatus of claim 1, wherein the controller is configured to obtain the first texture address of the first texture and compute the first texel offset value of a first texture space based on the first texture address.

6. The texture processing apparatus of claim 5, wherein the first texel offset value is computed based on a distance between a reference texel of the first texture of the first texture space and a texel of the first texture.

7. The texture processing apparatus of claim 1, wherein, if a size of a base map of the first texture and a size of a base map of the second texture are substantially the same, the controller is configured to determine that first texture address and the second texture address that are input with respect to the first texture and the second texture are the same.

8. The texture processing apparatus of claim 1, wherein, if a size of a base map of the first texture and a size of a base map of the second texture are not substantially the same, the controller is configured to compute a second texel offset value of a second texture space based on the second texture address of the second texture, to determine a texel address of the second texture based on the computed second texel offset value and an address of a reference texel of the second texture, and to obtain a texel value stored in the texel address of the second texture from the memory.

9. The texture processing apparatus of claim 1, wherein the texture filter is configured to transmit a filtering resultant value to a shader core.

10. A texture processing method wherein a texture processing apparatus performs filtering by using a plurality of textures, the texture processing method performing the steps comprising:
obtaining a first texture and a second texture that are continuously input;
determining whether a first texture address of the first texture and a second texture address of the second texture are the same;
if the first texture address and the second texture address are the same, designating a first texel offset value used to obtain a texel value of the first texture as being a second texel offset value of the second texture, and obtaining a texel value of the second texture from a memory based on the second texel offset value; and
performing filtering based on the texel value of the first texture and the texel value of the second texture.

11. The texture processing method of claim 10, further comprising: storing the first texel offset value.

12. The texture processing method of claim 11, wherein the obtaining the texel value of the second texture comprises: designating the stored first texel offset value as being the second texel offset value; determining a texel address of the second texture based on the first texel offset value; and obtaining the texel value stored at the texel address of the second texture from the memory.

13. The texture processing method of claim 10, further comprising: obtaining a first texture address of the first texture; and calculating the first texel offset value of a first texture space based on the first texture address of the first texture.

14. The texture processing method of claim 13, wherein the first texel offset value is computed based on a distance between a reference texel of the first texture of the first texture space and a texel of the first texture.

15. The texture processing method of claim 13, further comprising: determining the texture address of the first texture based on the first texel offset value and an address of a reference texel of the first texture; and obtaining a texel value stored at the texture address of the first texture from the memory.

16. The texture processing method of claim 10, wherein the determining of whether the first texture address of the first texture and the second texture address of the second texture are the same comprises: if a size of a base map of the first texture and a size of a base map of the second texture are substantially the same, determining that the first texture address of the first texture and the second texture address of the second texture are the same.

17. The texture processing method of claim 10, further comprising, if the texture address of the first texture and the texture address of the second texture are not substantially the same: calculating the second texel offset value of a second texture space based on the second texture address of the second texture; determining a texel address of the second texture based on a computed second texel offset value and an address of a reference texel of the second texture; and obtaining the texel value stored at the texel address of the second texture from the memory.

18. The texture processing method of claim 10, further comprising: transmitting a filtering resultant value to a shader core.

19. A graphic processing apparatus comprising: a shader-core configured to perform pixel shading to determine colors of pixels constituting a frame; and a texture processor configured to: obtain texture addresses with respect to a first texture and a second texture provided to the shader-core to determine the colors of the pixels, and designate a first texel offset value used to obtain a texel value of the first texture as being a second texel offset value to obtain a texel value of the second texture from a memory, and perform a filtering operation based on the texel value of the first texture and the texel value of the second texture if the texture address of the first texture and the texture address of the second texture are the same.

20. The graphic processing apparatus of claim 19, wherein the texture processor is configured to compute the first texel offset value of a first texture space based on the texture address of the first texture, store the computed first texel offset value, and use the stored first texel offset value to obtain the texel value of the second texture.

* * * * *